United States Patent
Liao et al.

(10) Patent No.: US 12,205,313 B2
(45) Date of Patent: Jan. 21, 2025

(54) METHOD AND APPARATUS FOR OBTAINING EXTENDED DEPTH OF FIELD IMAGE AND ELECTRONIC DEVICE

(71) Applicant: Huawei Technologies Co., Ltd., Shenzhen (CN)

(72) Inventors: Jiping Liao, Beijing (CN); Xiaofei Jia, Beijing (CN); Yingqiang Zhang, Shenzhen (CN); Shuxin Ouyang, Shenzhen (CN); Yu Li, Shenzhen (CN); Liang Wu, Shanghai (CN); Heng Sun, Shenzhen (CN); Shaokang Ma, Shenzhen (CN); Xingguang Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 17/698,631

(22) Filed: Mar. 18, 2022

(65) Prior Publication Data

US 2022/0207764 A1   Jun. 30, 2022

Related U.S. Application Data

(63) Continuation of application No. PCT/CN2020/116327, filed on Sep. 18, 2020.

(30) Foreign Application Priority Data

Sep. 18, 2019 (CN) .......................... 201910883037.6

(51) Int. Cl.
   *G06T 7/593* (2017.01)
(52) U.S. Cl.
   CPC .... *G06T 7/596* (2017.01); *G06T 2207/10028* (2013.01); *G06T 2207/20221* (2013.01)

(58) Field of Classification Search
   CPC ........... G06T 7/596; G06T 2207/10028; G06T 2207/20221
   See application file for complete search history.

(56) References Cited

U.S. PATENT DOCUMENTS

| | | |
|---|---|---|
| 8,009,189 B2 | 8/2011 | Ortyn et al. |
| 8,743,266 B2 | 6/2014 | Kishine |
| (Continued) | | |

FOREIGN PATENT DOCUMENTS

| | | |
|---|---|---|
| CN | 103460108 A | 12/2013 |
| CN | 103499879 A | 1/2014 |
| (Continued) | | |

OTHER PUBLICATIONS

S Litchfield, "Camera Nitty Gritty: Supplemental—EDoF," Apr. 15, 2010, 10 pages.

(Continued)

*Primary Examiner* — Utpal D Shah
(74) *Attorney, Agent, or Firm* — Conley Rose, P.C.

(57) ABSTRACT

A method and an apparatus for obtaining an extended depth of field image, where the method includes: determining a target focal length range based on an initial focal length, where the target focal length range includes the initial focal length; obtaining a plurality of images of a photographed object for a plurality of focal lengths in the target focal length range; and registering and fusing the plurality of images to obtain an extended depth of field image. The target focal length range of concern to a user is selected based on the initial focal length, such that there is no need to obtain images of all focal lengths of a lens, a quantity of obtained images and processing time of registration and fusion can be reduced.

20 Claims, 4 Drawing Sheets

(56) References Cited

U.S. PATENT DOCUMENTS

| | | | |
|---|---|---|---|
| 9,344,619 B2* | 5/2016 | Shroff | H04N 5/2226 |
| 9,386,213 B2* | 7/2016 | Matsumoto | H04N 23/676 |
| 9,807,372 B2 | 10/2017 | Bei et al. | |
| 2014/0022440 A1 | 1/2014 | Kishine | |
| 2014/0192216 A1* | 7/2014 | Matsumoto | H04N 23/61 |
| | | | 348/222.1 |
| 2014/0354781 A1 | 12/2014 | Matsuyama | |
| 2015/0109514 A1* | 4/2015 | Komatsu | H04N 5/2226 |
| | | | 348/349 |
| 2015/0365605 A1 | 12/2015 | Griffith et al. | |
| 2019/0265029 A1* | 8/2019 | Wang | G01C 11/14 |
| 2020/0145642 A1 | 5/2020 | Yu | |

FOREIGN PATENT DOCUMENTS

| | | |
|---|---|---|
| CN | 103888659 A | 6/2014 |
| CN | 104243828 A | 12/2014 |
| CN | 104270573 A | 1/2015 |
| CN | 106412426 A | 2/2017 |
| CN | 107800947 A | 3/2018 |
| CN | 108088424 A | 5/2018 |
| CN | 108876839 A | 11/2018 |
| CN | 109191413 A | 1/2019 |
| CN | 109919892 A | 6/2019 |
| CN | 110365887 A | 10/2019 |
| CN | 110476185 A | 11/2019 |
| CN | 110824689 A | 2/2020 |
| EP | 2618558 A1 | 7/2013 |
| EP | 2688284 A1 | 1/2014 |

OTHER PUBLICATIONS

L Wei, "Depth Image Super-Resolution Based on Deep-Learning," A Dissertation Submitted for the Degree of Master, Hefei University of Technology Hefei, Anhui, P.R. China Apr. 2018, with an English Abstract, 79 pages.

Nimin, "Research on the Key Technologies of RGB-D Image Processing Based on Deep Learning," Information and Communication Engineering, Master's Thesis, 2018, with an English Abstract, 53 pages.

* cited by examiner

METHOD AND APPARATUS FOR OBTAINING EXTENDED DEPTH OF FIELD IMAGE AND ELECTRONIC DEVICE

CROSS-REFERENCE TO RELATED APPLICATIONS

This is a continuation of International Patent Application No. PCT/CN2020/116327, filed on Sep. 18, 2020, which claims priority to Chinese Patent Application No. 201910883037.6, filed on Sep. 18, 2019. The disclosures of the aforementioned applications are hereby incorporated by reference in their entireties.

TECHNICAL FIELD

This application relates to the field of imaging technologies, and in particular, to a method and an apparatus for obtaining an extended depth of field image and an electronic device.

BACKGROUND

An optical imaging system can perform clear imaging at a limited distance. Only objects at a distance before and after a focal point of a lens can be imaged at definition of a specific extent. The depth before and after the focal point is referred to as a depth of field (DOF). The depth of field is affected by a hardware condition of the lens. To extend the depth of field and extend a depth range in which clear imaging can be performed in front of the lens, the depth of field may be extended using a hardware technology, a software technology, or a combination of the hardware technology and the software technology, such that most scenes in front of the lens can be clearly displayed on a photographed image. Currently, there is an extend depth of field technology in which images of all focal lengths of a zoom lens are obtained using the lens and multi-focus fusion processing is performed on the plurality of images using a deep learning algorithm to obtain a multi-focus image. However, in this manner, burden of a software system is increased, and photographing and processing time is increased. How to reduce processing time of extending a depth of field through multi-focus fusion becomes a problem that currently needs to be resolved urgently.

SUMMARY

This application provides a method and an apparatus for obtaining an extended depth of field image, and an electronic device, to resolve at least a technical problem that processing time of extending a depth of field through multi-focus fusion is relatively long.

According to a first aspect, this application provides a method for obtaining an extended depth of field image. The method includes: obtaining a depth information image of a photographed object; determining a target focal length range based on an initial focal length and the depth information image, where the target focal length range includes the initial focal length; obtaining a plurality of images of the photographed object for a plurality of focal lengths in the target focal length range; and registering and fusing the plurality of images to obtain an extended depth of field image. According to the solution provided in this embodiment, the target focal length range of concern to a user is selected using the initial focal length. As such, there is no need to obtain images of all focal lengths of a lens, a quantity of obtained images and processing time of registration and fusion can be reduced, and the extended depth of field image in the depth of field range of concern to the user can be obtained.

In a possible design, the determining a target focal length range based on an initial focal length and the depth information image includes: determining the initial focal length based on the photographed object, where the initial focal length is used to focus on the photographed object, and where the initial focal length is a focal length at which the lens currently performs focusing.

In a possible design, the obtaining the initial focal length based on the photographed object includes: determining the photographed object through automatic focus; or determining the photographed object based on an input of a user, where the input of the user includes a viewfinder specified by the user, and where the viewfinder specified by the user is determined by tapping a region of the viewfinder by the user on a touchable display screen.

In a possible design, the target focal length range is less than a range of all focal lengths of a focus motor in a shooting range.

In a possible design, the obtaining a plurality of images of the photographed object for a plurality of focal lengths in the target focal length range includes: sequentially selecting a plurality of focal lengths from one end to the other end of the target focal length range based on a preset spacing, to obtain a plurality of images of the photographed object.

In a possible design, the determining a target focal length range based on an initial focal length and the depth information range includes: collecting statistics about areas of pixels representing different depths in the depth information image, to obtain depth distribution; searching the depth distribution for a local pixel area peak value and a local pixel area valley value on both sides of a depth corresponding to the initial focal length; and determining the target focal length range based on a depth corresponding to the local pixel area peak value and a depth corresponding to the local pixel area valley value. According to the solution provided in this embodiment, a depth range of an object of concern to the user is more accurately found using a statistical feature of the depth distribution of the depth information image.

In a possible design, the collecting statistics about areas of pixels representing different depths in the depth information image includes: dividing a depth range covered by the depth information image into a plurality of depth intervals based on a preset depth spacing; and collecting statistics about an area of pixels representing depth values in each depth interval in the depth information image. According to the solution provided in this embodiment, the depth range is divided based on the spacing for obtaining the depth distribution through statistics collection, such that impact on a statistical feature of the depth distribution that is caused by an error in depth collection of the depth information image can be reduced, and more regular depth distribution can be obtained.

In a possible design, before the collecting statistics about areas of pixels representing different depths in the depth information image, the method further includes: performing image segmentation on the depth information image to obtain a plurality of image regions; and determining a target region from the plurality of image regions based on a focused location corresponding to the initial focal length. Correspondingly, the collecting statistics about areas of pixels representing different depths in the depth information image includes: collecting statistics about areas of pixels representing different depths in the target region, to obtain the depth distribution. According to the solution provided in this embodiment, different objects are distinguished using a segmentation result of the depth information image, to further narrow an image region for which the depth distribution is obtained through statistics collection, such that the determined target focal length range can more accurately cover a focal length range of an object of concern to the user.

In a possible design, the determining a target focal length range based on an initial focal length and the depth information range includes: obtaining a preview image of the photographed object; performing image segmentation on the preview image to obtain a plurality of image regions; determining a target region from the plurality of image regions based on a focused location corresponding to the initial focal length; obtaining the depth information image of the photographed object; and determining the target focal length range based on a depth value range of pixels in the target region. According to the solution provided in this embodiment, different objects are distinguished using a segmentation result of the preview image, and a focal length range corresponding to a depth range of an image region in which the focused location is located is used as the target focal length range, such that the determined target focal length range can more accurately cover a focal length range of an object of concern to the user.

In a possible design, before the determining a target focal length range based on an initial focal length and the depth information range, the method further includes: determining that a trigger condition for obtaining the initial focal length is met; and obtaining a focal length of current focusing, to obtain the initial focal length. According to the solution provided in this embodiment, the initial focal length can be prevented from being changed after each time of focusing, and the initial focal length is obtained only when the trigger condition for obtaining the initial focal length is met.

In a possible design, before the determining a target focal length range based on an initial focal length and the depth information range, the method further includes: determining that a trigger condition for obtaining the extended depth of field image is met. According to the solution provided in this embodiment, the method for obtaining an extended depth of field image can be applied to more use applications, such that another photographing function/mode can also be configured on an applied device, and the extended depth of field image is obtained only when the specified trigger condition is met.

In a possible design, the plurality of focal lengths in the target focal length range are obtained based on the following manner: determining a step focal length of the focus motor based on a photographing depth of field; and controlling the focus motor to perform step focusing in the target focal length range based on the step focal length, to obtain the plurality of focal lengths. According to the solution provided in this embodiment, as few images as possible can be obtained when a definition requirement is met, such that a quantity of times of step focusing is reduced, and processing time of image registration and fusion is reduced.

In a possible design, the registering and fusing the plurality of images to obtain an extended depth of field image includes: separately determining regions whose definition meets a preset condition from all of the plurality of images; and performing registration and fusion on the determined regions and a reference image to obtain the extended depth of field image. According to the solution provided in this embodiment, definition of the extended depth of field image can be improved.

In a possible design, one image of the photographed object is obtained each time the focus motor performs step focusing. According to the solution provided in this embodiment, an image obtained in a focusing process is not blurred.

In a possible design, the plurality of images are obtained by a first photographing module, the depth information image is obtained by a second photographing module, and a photographing lens of the first photographing module is adjacent to a photographing lens of the second photographing module. According to the solution provided in this embodiment, two adjacent photographing modules are used to enable ranges corresponding to the depth information image and a photographed image to coincide to the greatest extent.

According to a second aspect, this application provides an apparatus for obtaining an extended depth of field image. The apparatus includes: a first obtaining module configured to obtain a depth information image of a photographed object; a first determining module configured to determine a target focal length range based on an initial focal length, where the target focal length range includes the initial focal length; a first obtaining module configured to obtain a plurality of images of a photographed object for a plurality of focal lengths in the target focal length range; and an image processing module configured to register and fuse the plurality of images to obtain an extended depth of field image. According to the solution provided in this embodiment, the target focal length range of concern to a user is selected using the initial focal length, such that there is no need to obtain images of all focal lengths of a lens, a quantity of obtained images and processing time of registration and fusion can be reduced, and the extended depth of field image in the depth of field range of concern to the user can be obtained.

In a possible design, the first determining module is configured to determine the initial focal length based on the photographed object, where the initial focal length is used to focus on the photographed object, and where the initial focal length is a focal length at which a lens currently performs focusing.

In a possible design, the first determining module is configured to: determine the photographed object through automatic focus; or determine the photographed object based on an input of a user, where the input of the user includes a viewfinder specified by the user, and where the viewfinder specified by the user is determined by tapping a region of the viewfinder by the user on a touchable display screen.

In a possible design, the target focal length range is less than a range of all focal lengths of a focus motor in a shooting range.

In a possible design, the first obtaining module is configured to sequentially select a plurality of focal lengths from one end to the other end of the target focal length range based on a preset spacing, to obtain a plurality of images of the photographed object.

In a possible design, the first determining module includes: a first obtaining unit configured to obtain a depth information image of the photographed object; a statistics collection unit configured to collect statistics about areas of pixels representing different depths in the depth information image, to obtain depth distribution; a search unit configured to search the depth distribution for a local pixel area peak value and a local pixel area valley value on both sides of a depth corresponding to the initial focal length; and a first determining unit configured to determine the target focal length range based on a depth corresponding to the local pixel area peak value and a depth corresponding to the local pixel area valley value. According to the solution provided in this embodiment, a depth range of an object of concern to the user is more accurately found using a statistical feature of the depth distribution of the depth information image.

In a possible design, the statistics collection unit includes: a division subunit configured to divide a depth range covered by the depth information image into a plurality of depth intervals based on a preset depth spacing; and a statistics collection subunit configured to collect statistics about an area of pixels representing depth values in each depth interval in the depth information image. According to the solution provided in this embodiment, the depth range is divided based on the spacing for obtaining the depth distribution through statistics collection, such that impact on a statistical feature of the depth distribution that is caused by an error in depth collection of the depth information image can be reduced, and more regular depth distribution can be obtained.

In a possible design, the apparatus further includes: a segmentation module configured to: before statistics about the areas of the pixels representing different depths in the depth information image are collected, perform image segmentation on the depth information image to obtain a plurality of image regions; and a second determining module configured to determine a target region from the plurality of image regions based on a focused location corresponding to the initial focal length. Correspondingly, the statistics collection subunit is configured to collect statistics about areas of pixels representing different depths in the target region, to obtain the depth distribution. According to the solution provided in this embodiment, different objects are distinguished using a segmentation result of the depth information image, to further narrow an image region for which the depth distribution is obtained through statistics collection, such that the determined target focal length range can more accurately cover a focal length range of an object of concern to the user.

In a possible design, the first determining module includes: a second obtaining unit configured to obtain a preview image of the photographed object; a segmentation unit configured to perform image segmentation on the preview image to obtain a plurality of image regions; a second determining unit configured to determine a target region from the plurality of image regions based on a focused location corresponding to the initial focal length; a third obtaining unit configured to obtain the depth information image of the photographed object; and a third determining unit configured to determine the target focal length range based on a depth value range of pixels in the target region. According to the solution provided in this embodiment, different objects are distinguished using a segmentation result of the preview image, and a focal length range corresponding to a depth range of an image region in which the focused location is located is used as the target focal length range, such that the determined target focal length range can more accurately cover a focal length range of an object of concern to the user.

In a possible design, the apparatus further includes: a third determining module configured to: before the target focal length range is determined based on the initial focal length, determine that a trigger condition for obtaining the initial focal length is met; and a second obtaining module configured to obtain a focal length of current focusing, to obtain the initial focal length. According to the solution provided in this embodiment, the initial focal length can be prevented from being changed after each time of focusing, and the initial focal length is obtained only when the trigger condition for obtaining the initial focal length is met.

In a possible design, the apparatus further includes a fourth determining module configured to: before the target focal length range is determined based on the initial focal length, determine that a trigger condition for obtaining the extended depth of field image is met. According to the solution provided in this embodiment, the method for obtaining an extended depth of field image can be applied to more use applications, such that another photographing function/mode can also be configured on an applied device, and the extended depth of field image is obtained only when the specified trigger condition is met.

In a possible design, the plurality of focal lengths in the target focal length range are obtained using the following modules: a fifth determining module configured to determine a step focal length of the focus motor based on a photographing depth of field; and a control module configured to control the focus motor to perform step focusing in the target focal length range based on the step focal length, to obtain the plurality of focal lengths. According to the solution provided in this embodiment, as few images as possible can be obtained when a definition requirement is met, such that a quantity of times of step focusing is reduced, and processing time of image registration and fusion is reduced.

In a possible design, the image processing module includes: a fourth determining unit configured to separately determine regions whose definition meets a preset condition from all of the plurality of images; and an image processing unit configured to perform registration and fusion on the determined regions and a reference image to obtain the extended depth of field image. According to the solution provided in this embodiment, definition of the extended depth of field image can be improved.

In a possible design, the apparatus further includes a third obtaining module configured to obtain one image of the photographed object each time the focus motor performs step focusing. According to the solution provided in this embodiment, an image obtained in a focusing process is not blurred.

In a possible design, the plurality of images are obtained by a first photographing module, the depth information image is obtained by a second photographing module, and a photographing lens of the first photographing module is adjacent to a photographing lens of the second photographing module. According to the solution provided in this embodiment, two adjacent photographing modules are used to enable ranges corresponding to the depth information image and a photographed image to coincide to the greatest extent.

According to a third aspect, this application provides an electronic device, including: a first photographing module configured to obtain an image of a photographed object; an interface; and a processor, where the interface is configured to couple the first photographing module and the processor, and where the processor is configured to perform the method according to the first aspect. According to the solution provided in this embodiment, a target focal length range of concern to a user is selected using an initial focal length, such that there is no need to obtain images of all focal lengths of a lens, a quantity of obtained images and processing time of registration and fusion can be reduced, and an extended depth of field image in a depth of field range of concern to the user can be obtained.

In a possible design, the electronic device further includes a second photographing module configured to obtain a depth information image, where a photographing lens of the first photographing module is adjacent to a photographing lens of the second photographing module. According to the solution provided in this embodiment, two adjacent photographing modules are used to enable ranges corresponding to the depth information image and a photographed image to coincide to the greatest extent.

According to a fourth aspect, this application provides a computer-readable storage medium. The computer-readable storage medium stores a computer program. When the computer program runs on a computer, the computer is enabled to perform the method according to the first aspect, the second aspect, the third aspect, or the fourth aspect. According to the solution provided in this embodiment, a target focal length range of concern to a user is selected using an initial focal length, such that there is no need to obtain images of all focal lengths of a lens, a quantity of obtained images and processing time of registration and fusion can be reduced, and an extended depth of field image in a depth of field range of concern to the user can be obtained.

It can be learned that, in the foregoing aspects, the target focal length range of concern to the user is selected based on the initial focal length, such that there is no need to obtain images of all focal lengths of a lens, a quantity of obtained images and processing time of registration and fusion can be reduced, and the extended depth of field image in the depth of field range of concern to the user can be obtained, thereby resolving a technical problem in the conventional technology that processing time is relatively long when a depth of field is extended through multi-focus fusion.

DESCRIPTION OF EMBODIMENTS

Terms used in embodiments of this application are merely used to explain embodiments of this application, but are not intended to limit this application.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

Embodiments of this application provide a method for obtaining an extended depth of field image. The method may be applied to a device with a lens, for example, a camera, and may be further applied to an electronic device with a camera function, for example, a mobile phone, a tablet computer, a notebook computer, a palmtop computer, a mobile internet device (MID), or a wearable device (for example, a smartwatch, a smart band, or a pedometer).

Figure 1:
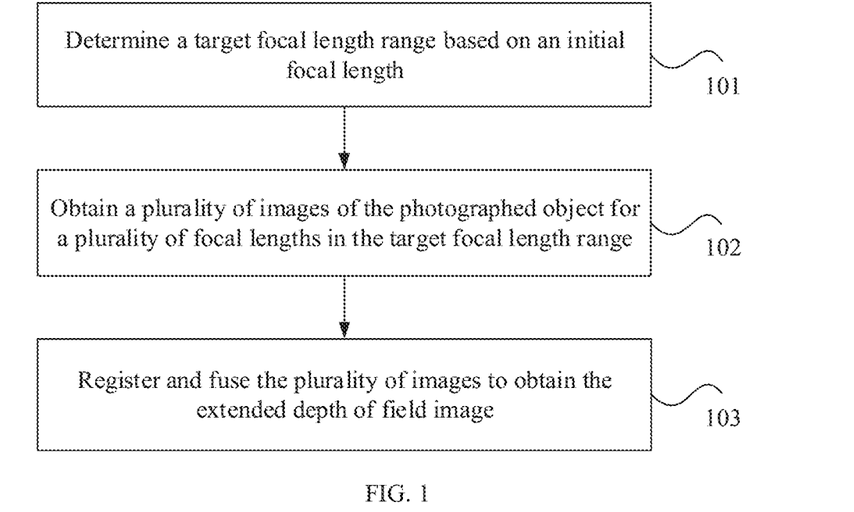
FIG. 1 is a flowchart of an optional method for obtaining an extended depth of field image according to an embodiment of this application.

FIG. 1 is a flowchart of an optional method for obtaining an extended depth of field image according to this application. As shown in FIG. 1, the method for obtaining an extended depth of field image in this embodiment includes the following steps 101 to 103.

Step 101: Determine a target focal length range based on an initial focal length and a depth information image. The target focal length range includes the initial focal length.

A focal length is a distance from a lens center of an imaging system to a principal focal point. For a thick lens (a lens whose thickness cannot be ignored) or an imaging system formed by a combination of several lenses or mirrors, a focal length is usually represented by an effective focal length (EFL). The EFL is the focal length in a broad sense. The initial focal length in this embodiment is a focal length of a lens or a lens group (referred to as a lens below) of an applied device. In a possible design, the imaging system can perform zooming. For example, the lens is pushed using a motor to move in a depth of field direction. In this design, the initial focal length is a focal length at which the lens currently performs focusing. In a possible implementation, the target focal length range is less than a range of all focal lengths of a focus motor in a shooting range.

Optionally, a focusing manner may be automatic focus or manual focus. Automatic focus (AF) is a manner in which a camera measures a distance for a specific region (which is a center by default or may be any region that is specified by a user and that is seen in a viewfinder) and then adjusts a focal length of the lens based on the distance of the specific region, such that imaging is clearer in the specific region. A person skilled in the art should understand that the viewfinder refers to a prompt box for focusing by the user or another interaction manner of implementing the function.

Optionally, before step 101 is performed, the depth information image of a photographed object first needs to be obtained.

Optionally, before step 101 is performed, it is first determined whether the initial focal length needs to be obtained, and after it is determined that a trigger condition for obtaining the initial focal length is met, the focal length of current focusing is obtained to obtain the initial focal length. For example, for the trigger condition for obtaining the initial focal length, if the user performs a tap operation, on a screen of a mobile phone in which a camera function is enabled, on a region in a viewfinder displayed on the touchable screen, it is determined that the trigger condition is met, and the focal length of current focusing is obtained; or if there is no operation within preset duration (for example, 1 second (s)) after the user performs a tap operation or a center region is selected as a focused location by default, it is determined that the trigger condition for obtaining the initial focal length is met.

In a possible design, the initial focal length is determined based on the photographed object, and the initial focal length is used to focus on the photographed object. It may be understood that the photographed object is an object of interest or of concern to the user, or in a possible case, the photographed object may be an entire photographing scene. The photographed object may be determined through automatic focus, or the photographed object may be determined based on an input of the user.

In a possible implementation, the input of the user includes a viewfinder specified by the user. For example, in an optional application scenario, the user enables the camera function of the mobile phone, and taps a region in a viewfinder displayed on the touchable display screen, and the mobile phone controls a lens to perform automatic focus at a focal length of the region that is of concern and that is tapped by the user. The focal length of current automatic focus is the initial focal length, and an interface of interaction with the user is presented on the touchable display screen.

After the initial focal length is determined, the target focal length range is obtained by extending or narrowing a range based on the initial focal length. The target focal length range is a range determined based on the initial focal length, the target focal length range includes the initial focal length, the target focal length range is a focal length range in which clear imaging is required, and the target focal length range is usually greater than a hardware depth of field of the lens at a single focal length. Optionally, when the target focal length range is determined based on the initial focal length, the target focal length range may be determined using a default depth of a system (depth pre-specified by the system) and a default location of the initial focal length in the target focal length range. For example, after the camera function is enabled on the mobile phone and focusing is performed at a focal length $F_1$, it is determined, based on the default depth f of the target focal length range and a condition that the initial focal length is at a central location of the target focal length range, that the target focal length range is ($F_1$−f/2, $F_1$+f/2).

Alternatively, when the target focal length range is determined based on the initial focal length, a depth of the target focal length range may be specified by the user. In an optional implementation scenario, after the mobile phone performs focusing at a focal length $F_1$, the user taps a function icon for manually extending a depth of field, adjusts the target focal length range using an operation of two-finger scaling, determines a current target focal length range based on a displayed number axis, and determines the target focal length range after tapping an OK icon.

In another optional design, when the target focal length range is determined based on the initial focal length, a focal length range of most concern to the user may be determined using depth distribution information of the depth information image of the photographed object and the initial focal length, to obtain the target focal length range. For example, in an optional implementation, the determining a target focal length range based on an initial focal length and the depth information range in step 101 includes the following steps.

Step 11: Obtain the depth information image of the photographed object.

Figure 2:
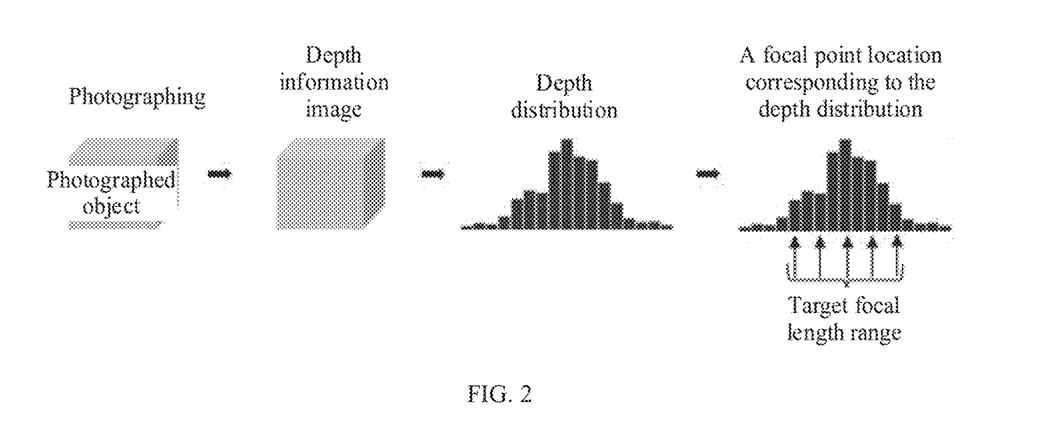
FIG. 2 is a schematic diagram of obtaining depth distribution of a depth information image in an optional method for obtaining an extended depth of field image according to an embodiment of this application.
Figure 3A:
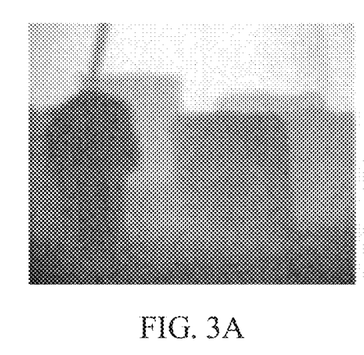
FIG. 3A and FIG. 3B are respectively schematic diagrams of a depth information image and a color image that are photographed for a same scene.
Figure 3B:
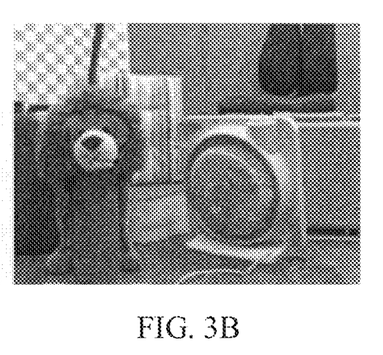

The depth information image is an image photographed by a time of flight (TOF) camera. In a TOF distance measurement method, optical pulses are continuously sent to an object, and then light returned by the object is received using a sensor. An object distance is obtained by detecting time of flight (e.g., round-trip time (RTT)) of the optical pulses. The depth information image is a gray image. As shown in FIG. 2, after a photographed object is photographed, a gray image is obtained, and each pixel in the image carries depth information using a magnitude of a pixel value. FIG. 3A and FIG. 3B show a difference between a depth information image (FIG. 3A) and a color image (FIG. 3B, where FIG. 3B shows an effect of a gray image converted from the color image) that are obtained by photographing a photographed object in a same shooting range. The color image is obtained by collecting a color reflected by an object for ambient light, a gray value of the depth information image represents time that the object takes to perform reflection for pulse light, and information content carried in pixel values of the color image and the depth information image is different. To be more specific, in a matrix of the depth information image, each matrix element corresponds to a pixel at a corresponding location in the image, a value of each matrix element is a pixel value, and a magnitude of the pixel value represents a magnitude of a depth value. For example, an object closer to the TOF camera has a smaller depth and corresponds to a smaller pixel value and higher brightness in the depth information image, and an object farther from the TOF camera has a larger depth and corresponds to a larger pixel value and lower brightness in the depth information image.

After the initial focal length is determined, the TOF camera is started to photograph the depth information image and obtain the depth information image of the photographed object.

Step 12: Collect statistics about areas of pixels representing different depths in the depth information image, to obtain depth distribution.

A pixel value of each pixel in the depth information image is used to represent a depth (namely, a distance between a corresponding object and the TOF camera) of the object in the image, and pixel values are discrete. Therefore, in this step, in an optional implementation of collecting statistics about areas of pixels of different depths, statistics about a quantity of pixels of each pixel value are collected, and the quantity of pixels is used to represent an area. As shown in FIG. 2, a histogram shows the depth distribution of the depth information image, a horizontal axis is a pixel value, and a vertical axis is a quantity of pixels corresponding to the pixel value. For example, in the depth information image, pixel values 0 to 255 represent a smallest depth to a largest depth, and statistics about quantities $P_0$ to $P_{255}$ of pixels of the pixel values 0 to 255 are separately collected, to obtain the depth distribution of the depth information image. The depth distribution is used to describe areas occupied by pixels of different depths.

Optionally, to reduce impact on the depth distribution of the depth information image that is caused by a distance measurement error, when the depth distribution is obtained through statistics collection, a total depth range covered by the depth information image may be further divided based on a specified spacing (a preset depth spacing), to obtain a plurality of depth intervals, and statistics about an area of pixels included in each depth interval are collected. For example, in the depth information image, pixel values 0 to 255 represent a smallest depth to a largest depth, and statistics about a quantity of pixels of every four pixel values are collected, to be more specific, statistics about a quantity of pixels of pixel values 0 to 3, a quantity of pixels of pixel values 4 to 7, a quantity of pixels of pixel values 8 to 11, and the like are separately collected, to obtain the depth distribution of the depth information image. The depth range is divided based on the spacing for obtaining the depth distribution through statistics collection, such that impact on a statistical feature that is caused by a TOF distance measurement error can be reduced, and more regular depth distribution can be obtained.

Step 13: Search the depth distribution for a local pixel area peak value and a local pixel area valley value on both sides of a depth corresponding to the initial focal length.

The depth distribution is obtained by collecting statistics based on depth values, and sorting is performed on magnitudes of depths. To determine the target focal length range, on both sides of the depth corresponding to the initial focal length, searching is performed for a peak value and a valley value that are closest to the depth corresponding to the initial focal length, namely, a local pixel area peak value (referred to as a local peak value below) and a local pixel area valley value (referred to as a local valley value below). The local peak value and the local valley value may be calculated using a derivation algorithm for discrete data. In an optional implementation, a discrete derivative is directly calculated by performing addition and subtraction on values (namely, pixel areas) of dependent variables corresponding to a plurality of adjacent independent variables (depth values). When depth values are represented by pixel values, a discrete derivative corresponding to a median pixel value may be calculated using quantities of pixels of a plurality of adjacent pixel values. For example, if quantities of pixels of five depth-adjacent pixel values 4 to 8 are respectively P4 to P8, a discrete derivative of a median pixel value 6 may be calculated as $\Sigma(Pi-Pi-1)/4$ using P4 to P8, where i=5-8. After discrete derivatives corresponding to all pixel values are calculated, a location corresponding to a discrete derivative with an absolute value that is close to 0 (where a difference between the absolute value and 0 is less than or equal to a preset value) is a local peak value or a local valley value, and it may be further determined, based on a magnitude of a quantity of pixels, whether the location is a local peak value or a local valley value. After each local peak value and each local valley value are determined, a local peak value closest to the initial focal length is selected, and then two local valley values closest to the local peak value are determined on both sides of the local peak value.

Step 14: Determine the target focal length range based on a depth corresponding to the local pixel area peak value and a depth corresponding to the local pixel area valley value. After the local pixel area peak value and the local pixel area valley value are determined, a required depth range may be determined. The depth is an actual distance between the object and the camera. A corresponding focal length range may be determined based on the depth range, to obtain the target focal length range.

When the target focal length range is determined based on the depth corresponding to the local pixel area peak value and the depth corresponding to the local pixel area valley value, a depth range between two local valley values may be selected and considered as a depth range of the photographed object of concern, and the target focal length range is further determined based on the depth range between the two local valley values. A principle thereof is as follows: Generally, distribution of an object with a relatively regular surface in the depth information image is also relatively regular. Therefore, if a local pixel area peak value and a local pixel area valley value are found, it may be considered that a depth distribution range of an object focused at the initial focal length is determined. The depth range of the object of concern may be obtained by searching for the local peak value and the local valley value. Further, a corresponding focal length range is calculated to obtain a target focal length range. Alternatively, in an optional implementation, if a depth distance between a local peak value and a local valley value with a relatively small depth (corresponding to a relatively small pixel value) is less than a depth distance between a local peak value and a local valley value with a relatively large depth (corresponding to a relatively large pixel value), the target focal length range is calculated as two times of the depth distance between the local peak value and the local valley value with a small depth (corresponding to a small pixel value). A principle thereof is as follows: Generally, a location at a long distance (with a large depth) is not of concern. To narrow the target focal length range, when the distance between the local peak value and the local valley value with a small depth is short, a depth range of concern is determined using the distance between the local peak value and the local valley value with a small depth as a reference, and the location with a large depth is not photographed, such that subsequent photographing time and image processing time of registration and fusion can be reduced.

In this embodiment, in some scenarios (for example, when an object at a relatively long distance, for example, landscape, is photographed), an object distance of the focused object may be long (for example, a mountain and water), such that a calculated target focal length range covers a range of all focal lengths. This case is equivalent to extending a depth of field for all the focal lengths.

Optionally, because there may be a plurality of objects in a same depth range in the depth information image, to enable a curve of the depth distribution obtained through statistics collection to describe different objects, before the depth distribution is obtained through statistics collection, image segmentation may be performed on the depth information image to obtain a plurality of image regions. In this way, the depth information image may be divided into a plurality of blocks based on depth mutation. It can be learned from FIG. 3A that depth mutation usually does not occur on a same object. Therefore, there are usually different objects in different image regions obtained through segmentation, such that objects that are not adjacent in a same depth range can be effectively distinguished. Image segmentation may use an existing image segmentation algorithm, for example, an edge-based or region-based image segmentation algorithm. This is not specifically limited in this embodiment. After the plurality of image regions are obtained, a location focused at the initial focal length is determined, and a target region is selected based on the focused location from the plurality of image regions obtained through segmentation. Correspondingly, when step 12 is performed, statistics about the target region corresponding to the focused location are collected to obtain the depth distribution.

Optionally, in some application scenarios, for example, when photographing is performed in a macro mode, because an object at a relatively long distance is usually not of real concern to the user, when any one of the foregoing manners of obtaining the depth distribution through statistics collection is used, a proportion or a default distance may be pre-selected, and depth distribution is obtained through statistics collection only in a depth range of the proportion or the default distance. For example, a larger pixel value in the depth information image indicates a larger depth and a longer distance, and a largest pixel value is 255. In addition, because a pixel value is 0 or a relatively small value for there is a collection error or the system cannot obtain the pixel value or another reason, a relatively small pixel value has relatively low accuracy and relatively small reference value. Therefore, middle pixels may be pre-selected, for example, pixel values whose proportions fall between 0.1 and 0.7 may be selected, in other words, statistics about pixel values between 0.1*255~25 and 0.7*255≈178 are collected to obtain depth distribution.

In another optional design, when the target focal length range is determined based on the initial focal length, image segmentation may be alternatively performed on a current image using an image segmentation algorithm, and an object of concern to the user is determined based on a focused location corresponding to the initial focal length, to determine a region of the object of concern. For example, the following steps are performed during step 101.

Step 21: Obtain a preview image of the photographed object.

Step 22: Perform image segmentation on the preview image to obtain a plurality of image regions.

Step 23: Determine a target region from the plurality of image regions based on the focused location corresponding to the initial focal length.

Step 24: Obtain the depth information image of the photographed object.

Step 25: Determine the target focal length range based on a depth value range of pixels in the target region.

The preview image is a background image, and may be cached in a cache component of a device instead of being stored in a memory of the device. After the preview image is obtained, image segmentation is performed on the preview image to obtain the plurality of image regions. Image segmentation may use an existing image segmentation algorithm, for example, an edge-based or region-based image segmentation algorithm. This is not specifically limited in this embodiment. It should be noted that the preview image is a color image that is shown in FIG. 3B and that is sensed for light reflected on a surface of an object, and is different from the depth information image. The depth information image is an image sensed for time of light propagation, and a pixel value of the depth information image is used to represent a depth of an object. Therefore, adjacent objects of a same depth cannot be well distinguished after image segmentation is performed on the depth information image. The preview image is a color image collected by an imaging module that performs focusing at the initial focal length, and reflects a color that is of an object and that is presented under a current light source. Therefore, different objects can be accurately distinguished after image segmentation is performed on the preview image. After the preview image is divided to obtain the plurality of image regions, the corresponding target region is determined from the plurality of image regions based on the focused location corresponding to the initial focal length. Further, the depth information image of the photographed object is obtained, and a depth range in the target region is determined, to obtain the corresponding target focal length range.

In step 101, when the depth information image needs to be obtained, the depth information image is obtained by a second photographing module. The second photographing module may be a TOF camera module.

The preview image is obtained by a first photographing module, and the initial focal length is a focal length at which the first photographing module performs focusing.

The second photographing module and the first photographing module are adjacent to each other in the device. Optionally, equivalent central axes of the second photographing module and the first photographing module are set to be parallel, for example, a TOF camera module and a complementary metal-oxide-semiconductor (CMOS) imaging module that are disposed adjacent and in parallel to each other on an upper right part on the back of the mobile phone. The TOF camera module includes a TOF sensor and a pulse light source disposed adjacent to the TOF sensor. The pulse light source is configured to emit pulse light to an object; the TOF sensor is configured to: receive light reflected back by the object, and calculate a distance (depth) of the object based on a sending and receiving time difference; and the CMOS imaging module is configured to photograph a color RGB (red, green, blue) image.

Step 102: Obtain a plurality of images of the photographed object for a plurality of focal lengths in the target focal length range.

Step 102 may be performed after step 101. The plurality of images are obtained by the first photographing module. The plurality of focal lengths are a plurality of focal lengths selected from the target focal length range. Optionally, a method for selecting the plurality of focal lengths from the target focal length range may be sequentially selecting a plurality of focal lengths from one end to the other end of the target focal length range based on a preset spacing. The preset spacing may be a spacing that is determined based on a photographing depth of field and that is used for selecting a plurality of focal lengths, or may be preset by the system. As shown in FIG. 2, after the depth distribution is determined, depths corresponding to a plurality of focal point locations in a depth range corresponding to the target focal length range are determined on the depth distribution.

Figure 4:
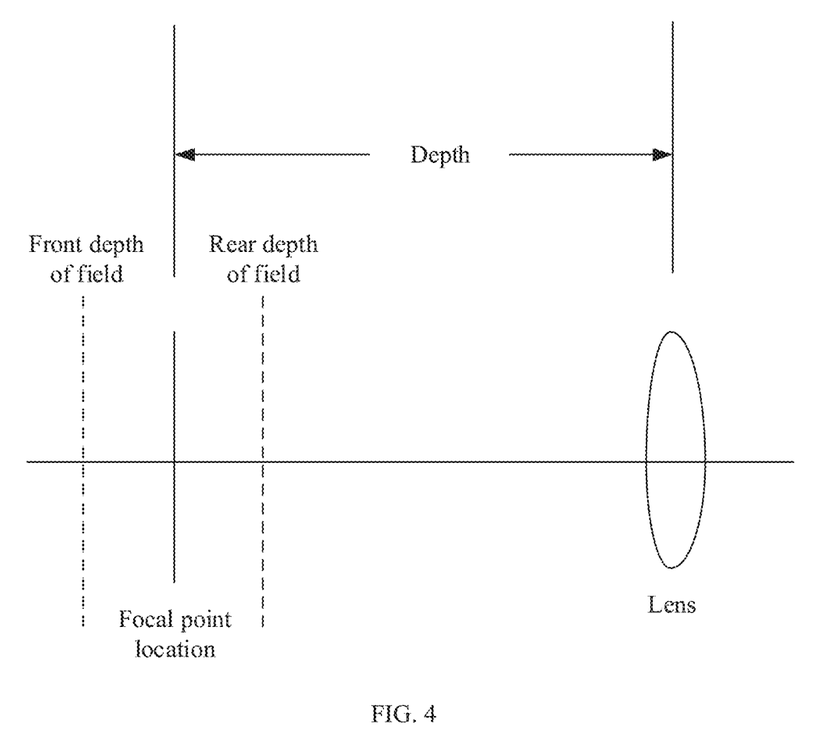
FIG. 4 is a schematic diagram of a photographing depth of field according to this application.

Optionally, a photographing module has a specific hardware depth of field, in other words, after focusing is performed at a focusing focal length, there is a distance between a front depth of field and a rear depth of field of a focused location. As shown in FIG. 4, objects in a range before and after the focused location can be imaged relatively clearly (where definition falls within an allowed range). Therefore, the spacing for selecting a plurality of focal lengths may be determined based on the photographing depth of field. The photographing depth of field in this embodiment is a front depth of field and a rear depth of field at which the photographing module can perform clear imaging (where definition exceeds a specified threshold). A step focal length is determined based on an object distance between the front depth of field and the rear depth of field. A focal length may be determined based on an object distance through a combination of table search and linear interpolation. An example calibration relationship between an object distance and a focal length EFL of the photographing module is shown in the following table:

| Object distance (mm) | EFL (mm) |
| --- | --- |
| INF | 7.23 |
| 5000 | 7.22 |
| 3000 | 7.21 |
| 2000 | 7.21 |
| 1500 | 7.2 |
| 1200 | 7.19 |
| 1020 | 7.18 |

After a focal length corresponding to the front depth of field and a focal length corresponding to the rear depth of field are determined through the combination of table search and linear interpolation, a distance between the focal length corresponding to the front depth of field and the focal length corresponding to the rear depth of field is calculated as the step focal length. During each time of focusing, the lens controls a distance by which the focus motor pushes the lens to move based on the step focal length.

In an optional design, after the step focal length is determined, the focus motor is controlled to push the lens (the lens group) to perform focusing in the target focal length range based on the step focal length. After each time of step focusing, one image of the photographed object is obtained, to obtain a plurality of images of the photographed object. The focus motor may be a voice coil motor (VCM). The voice coil motor is characterized by a high frequency response and high precision. A main principle of the voice coil motor is as follows: In a permanent magnetic field, a magnitude of a direct current of a coil in the motor is changed to control a stretching location of a spring plate, such that the lens moves forward or backward. When the focus motor is controlled, a voice coil motor code (VCM code) may be used to control a target location to which the motor moves. The voice coil motor code indicates a preset code value representing the location to which the motor moves.

Optionally, before the determining a target focal length range based on an initial focal length and the depth information range in step 101, it is first determined whether a trigger condition for obtaining an extended depth of field image is met. For example, the trigger condition may be that the device enters a specified photographing mode such as a macro mode (a photographing mode applicable to a case in which the photographed object is close to the lens of the camera). In this mode, the method for obtaining an extended depth of field image is enabled, to perform relatively clear imaging on different locations of an object close to the camera in the image and that is of concern to the user. Alternatively, the trigger condition may be that the user selects an extend depth of field function, for example, taps an icon corresponding to "extend depth of field" in a camera function interface of the mobile phone. The target focal length range is determined based on the initial focal length when it is determined that the trigger condition for obtaining the extended depth of field image is met.

Step 103: Register and fuse the plurality of images to obtain the extended depth of field image.

After the plurality of images are obtained, the images of the plurality of focal lengths are registered and fused to obtain the extended depth of field image. The extended depth of field image in this embodiment is obtained by fusing multi-focus images. The multi-focus images are a series of images photographed at different focal lengths, and the images can be clearly imaged at different depths. Because an object corresponding to an image of each focal length in a corresponding depth of field range can be clearly imaged, the fused extended depth of field image can be clearly imaged at a longer depth, such that an extend depth of field or an extended depth of focus (EDOF) effect is achieved.

Image registration is alignment of two or more images of a same object at spatial locations. An image registration process may also be referred to as image matching or image correlation. For example, a procedure of a registration technology may be as follows: first extracting features of two images to obtain feature points; finding a matched feature point pair through similarity measurement; then obtaining spatial coordinate transformation parameters of the images based on the matched feature point pair; finally, performing image registration based on the coordinate transformation parameters. Feature extraction is the key of the registration technology. Accurate feature extraction ensures successful feature matching. Image fusion means performing image processing, a computer technology, and the like on image data collected on multi-source channels for a same target, extracting favorable information in the respective channels to the greatest extent, and finally obtaining a high-quality image through combination.

Optionally, an image registration and fusion algorithm may be an algorithm based on a neural network, and the neural network may be a convolutional neural network (CNN), a deep convolutional neural network (DCNN), a recurrent neural network (RNN), or the like. A plurality of images are input into a pre-trained neural network model to output a fused image. A training objective of the neural network model is that definition of the output image is the highest. Image definition is an important indicator used to measure quality of an image. In quality evaluation without a reference image, image definition can better correspond to subjective feelings of a person. Low image definition indicates a blurred image. An evaluation metric of the definition may be a calculation result of an algorithm such as a Brenner gradient function or a sum of modulus of gray difference (e.g., sum modulus difference (SMD)) function.

Because the CNN is a common neural network, the following uses the CNN as an example to describe an optional implementation of registration and fusion. The CNN is a feed-forward artificial neural network, and each neuron in the feed-forward artificial neural network may respond to an image input into the neuron. The CNN may include an input layer, a convolutional layer, and a neural network layer. The convolutional layer may include a plurality of convolution operators. The convolution operator is also referred to as a kernel. In image processing, the convolution operator functions as a filter that extracts specific information from a matrix of an input image. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction in the input image, to extract a specific feature from the image. A size of the weight matrix is related to a size of the image. Different weight matrices may be used to extract different features in the image. Weight values in these weight matrices need to be obtained through a large quantity of times of training in actual application. Each weight matrix including trained weight values may be used to extract information from the input image, such that the convolutional neural network performs correct prediction. In this embodiment, the convolutional layer may be used to extract a region that is in each image and whose definition is greater than a preset threshold. After the convolutional layer performs extraction, registration and fusion are performed on the extracted region with relatively high definition and a reference image using a hidden layer in the neural network layer, and an extended depth of field image is obtained using an output layer. Optionally, the reference image may be an image in the plurality of images that has highest definition. Alternatively, the reference image may be the foregoing depth information image.

Figure 5:
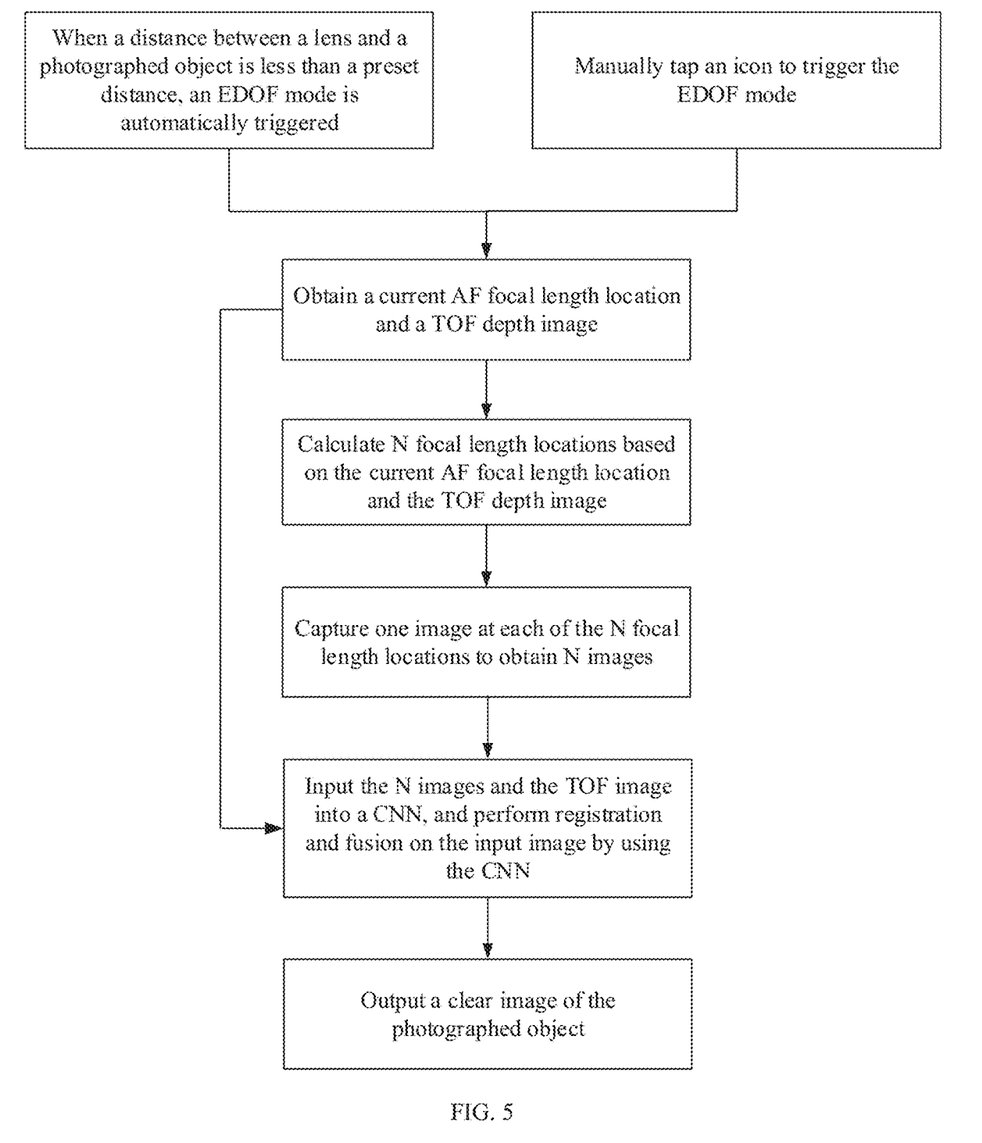
FIG. 5 is a flowchart of another optional method for obtaining an extended depth of field image according to an embodiment of this application.

With reference to FIG. 5, the following describes an optional implementation of the method for obtaining an extended depth of field image provided in this embodiment. The method includes the following steps.

When a distance between a lens and a photographed object is less than a preset distance and the device enters a macro mode, the method for obtaining an extended depth of field image provided in this embodiment is automatically triggered, and the device automatically enters an EDOF mode. Alternatively, when a user manually taps an icon, an EDOF mode is actively triggered.

After the device enters the EDOF mode, an obtained focal length location of auto focus and a TOF image are obtained. Auto focus may be performed before the device enters the EDOF mode. A focusing focal length is cached in the device. After the device enters the EDOF mode, the cached focusing focal length is obtained. After the device enters the EDOF mode, a TOF depth image is collected using a TOF photographing module.

N focal length locations that need to be photographed are determined based on depth distribution of the TOF depth image and the focal length location of auto focus.

A focus motor is controlled to push the lens to focus on each of the N focal length locations, and one image is captured at each focal length location to obtain N images.

The N images and the TOF image are input into a CNN, and registration and fusion are performed on the input image using the CNN, to obtain a fused clear image.

Finally, the clear image of the photographed object is output and stored in a memory of the device. It should be noted that only the final fused image is output, and a depth image, the TOF depth image, and the like that are collected in the process of performing the method are processed in the background, and are cached in a cache of the device.

According to the method provided in the foregoing embodiment, depth statistics information of a photographed object in a TOF image is used, only a TOF photographing module and a normal photographing module need to be configured on a device implementing the foregoing method, a special lens and a corresponding software algorithm are not required, the focus motor does not need to move in a range of all focal lengths in a shooting range, and only a depth of an object of real concern to a user is collected, such that processing time of extending a depth of field is reduced while the photographed object is clear.

In this embodiment, the target focal length range of concern to the user is selected using the initial focal length, such that there is no need to obtain images of all focal lengths of the lens, a quantity of obtained images and processing time of registration and fusion can be reduced, and the extended depth of field image in the depth of field range of concern to the user can be obtained.

It may be understood that some or all of the steps or operations in the foregoing embodiments are merely examples. Other operations or variations of various operations may be further performed in this embodiment of this application. In addition, the steps may be performed in sequences different from the sequences presented in the foregoing embodiments, and not all operations in the foregoing embodiments are necessarily to be performed.

This application provides an apparatus for obtaining an extended depth of field image. The apparatus may be configured to implement the foregoing method embodiments.

Figure 6:
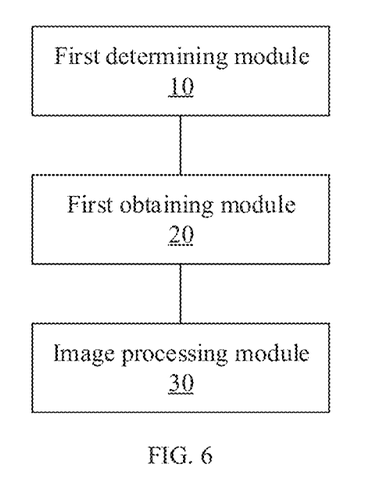
FIG. 6 is a schematic block diagram of an optional apparatus for obtaining an extended depth of field image according to an embodiment of this application.

FIG. 6 is a schematic diagram of a structure of an apparatus for obtaining an extended depth of field image. The apparatus for obtaining an extended depth of field image in the embodiment shown in FIG. 6 may be configured to perform the technical solutions in the foregoing method embodiments. For implementation principles and technical effects of the apparatus, further refer to related descriptions in the method embodiments. As shown in FIG. 6, the apparatus for obtaining an extended depth of field image includes a first determining module 10, a first obtaining module 20, and an image processing module 30.

The first determining module 10 is configured to determine a target focal length range based on an initial focal length. The target focal length range includes the initial focal length. The first obtaining module 20 is configured to obtain a plurality of images of a photographed object for a plurality of focal lengths in the target focal length range. The image processing module 30 is configured to register and fuse the plurality of images to obtain an extended depth of field image. According to the solution provided in this embodiment, the target focal length range of concern to a user is selected using the initial focal length, such that there is no need to obtain images of all focal lengths of a lens, a quantity of obtained images and processing time of registration and fusion can be reduced, and the extended depth of field image in the depth of field range of concern to the user can be obtained.

In a possible manner, the first determining module 10 includes: a first obtaining unit configured to obtain a depth information image of the photographed object; a statistics collection unit configured to collect statistics about areas of pixels representing different depths in the depth information image, to obtain depth distribution; a search unit configured to search the depth distribution for a local pixel area peak value and a local pixel area valley value on both sides of a depth corresponding to the initial focal length; and a first determining unit configured to determine the target focal length range based on a depth corresponding to the local pixel area peak value and a depth corresponding to the local pixel area valley value. According to the solution provided in this embodiment, a depth range of an object of concern to the user is more accurately found using a statistical feature of the depth distribution of the depth information image.

In a possible manner, the statistics collection unit includes: a division subunit configured to divide a depth range covered by the depth information image into a plurality of depth intervals based on a preset depth spacing; and a statistics collection subunit configured to collect statistics about an area of pixels representing depth values in each depth interval in the depth information image. According to the solution provided in this embodiment, the depth range is divided based on the spacing for obtaining the depth distribution through statistics collection, such that impact on a statistical feature of the depth distribution that is caused by an error in depth collection of the depth information image can be reduced, and more regular depth distribution can be obtained.

In a possible manner, the apparatus further includes: a segmentation module configured to: before statistics about the areas of the pixels representing different depths in the depth information image are collected, perform image segmentation on the depth information image to obtain a plurality of image regions; and a second determining module configured to determine a target region from the plurality of image regions based on a focused location corresponding to the initial focal length. Correspondingly, the statistics collection subunit is configured to collect statistics about areas of pixels representing different depths in the target region, to obtain the depth distribution. According to the solution provided in this embodiment, different objects are distinguished using a segmentation result of the depth information image, to further narrow an image region for which the depth distribution is obtained through statistics collection, such that the determined target focal length range can more accurately cover a focal length range of an object of concern to the user.

In a possible manner, the first determining module includes: a second obtaining unit configured to obtain a preview image of the photographed object; a segmentation unit configured to perform image segmentation on the preview image to obtain a plurality of image regions; a second determining unit configured to determine a target region from the plurality of image regions based on a focused location corresponding to the initial focal length; a third obtaining unit configured to obtain the depth information image of the photographed object; and a third determining unit configured to determine the target focal length range based on a depth value range of pixels in the target region. According to the solution provided in this embodiment, different objects are distinguished using a segmentation result of the preview image, and a focal length range corresponding to a depth range of an image region in which the focused location is located is used as the target focal length range, such that the determined target focal length range can more accurately cover a focal length range of an object of concern to the user.

In a possible manner, the apparatus further includes: a third determining module configured to: before the target focal length range is determined based on the initial focal length, determine that a trigger condition for obtaining the initial focal length is met; and a second obtaining module configured to obtain a focal length of current focusing, to obtain the initial focal length. According to the solution provided in this embodiment, the initial focal length can be prevented from being changed after each time of focusing, and the initial focal length is obtained only when the trigger condition for obtaining the initial focal length is met.

In a possible manner, the apparatus further includes a fourth determining module configured to: before the target focal length range is determined based on the initial focal length, determine that a trigger condition for obtaining the extended depth of field image is met. According to the solution provided in this embodiment, the method for obtaining an extended depth of field image can be applied to more use applications, such that another photographing function/mode can also be configured on an applied device, and the extended depth of field image is obtained only when the specified trigger condition is met.

In a possible manner, the plurality of focal lengths in the target focal length range are obtained using the following modules: a fifth determining module configured to determine a step focal length of a focus motor based on a photographing depth of field; and a control module configured to control the focus motor to perform step focusing in the target focal length range based on the step focal length, to obtain the plurality of focal lengths. According to the solution provided in this embodiment, as few images as possible can be obtained when a definition requirement is met, such that a quantity of times of step focusing is reduced, and processing time of image registration and fusion is reduced.

In a possible manner, the image processing module includes: a fourth determining unit configured to separately determine regions whose definition meets a preset condition from all of the plurality of images; and an image processing unit configured to perform registration and fusion on the determined regions and a reference image to obtain the extended depth of field image. According to the solution provided in this embodiment, definition of the extended depth of field image can be improved.

In a possible manner, the apparatus further includes a third obtaining module configured to obtain one image of the photographed object each time the focus motor performs step focusing. According to the solution provided in this embodiment, an image obtained in a focusing process is not blurred.

In a possible manner, the plurality of images are obtained by a first photographing module, the depth information image is obtained by a second photographing module, and a photographing lens of the first photographing module is adjacent to a photographing lens of the second photographing module. According to the solution provided in this embodiment, two adjacent photographing modules are used to enable ranges corresponding to the depth information image and a photographed image to coincide to the greatest extent.

The processor described in this application may be implemented on an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may also be manufactured using various 1C process technologies, for example, a complementary metal-oxide-semiconductor (CMOS), a negative channel (n-channel) metal oxide semiconductor (NMOS), a positive channel (p-channel) metal oxide semiconductor (PMOS), a bipolar junction transistor (BJT), a bipolar CMOS (BiCMOS), silicon germanium (SiGe), gallium arsenide (GaAs), etc.

It should be understood that division into the modules of the apparatus is merely division of logical functions. In actual implementation, all or some of the modules may be integrated into one physical entity or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the processing module may be an independent processing element; or may be integrated in a chip of the communications apparatus, for example, a terminal, for implementation; or moreover, may alternatively be stored in a memory of the communications apparatus in a form of a program, and is invoked by a processing element of the communications apparatus to perform the functions of the foregoing modules. An implementation of another module is similar to the implementation of the determining module. In addition, all or some of these modules may be integrated together, or may be implemented independently. The processing element herein may be an integrated circuit and has a signal processing capability. In an implementation process, steps in the foregoing method or the foregoing modules may be implemented using a hardware integrated logic circuit in the processor element or using instructions in a form of software.

For example, the foregoing modules may be configured as one or more integrated circuits that implement the foregoing methods, such as one or more ASICs, one or more microprocessors (e.g., digital signal processors (DSPs)), or one or more field-programmable gate arrays (FPGAs). For another example, when one of the foregoing modules is implemented in a form of a processing element scheduling a program, the processing element may be a general-purpose processor, for example, a central processing unit (CPU) or another processor that may invoke the program. For still another example, these modules may be integrated together and implemented in a form of a system-on-a-chip (SOC).

Figure 7:
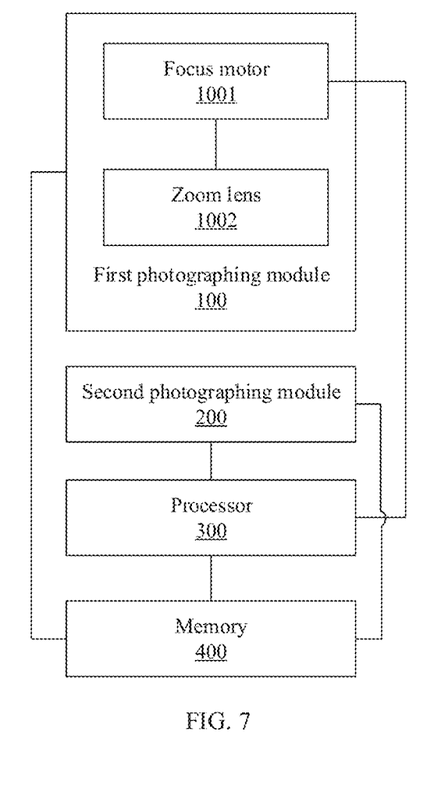
FIG. 7 is a schematic block diagram of an optional electronic device according to an embodiment of this application.

This application further provides an electronic device. As shown in FIG. 7, an optional electronic device provided in this embodiment includes a first photographing module 100, an interface (not shown in FIG. 7), and a processor 300. The first photographing module 100 is configured to obtain an image of a photographed object, the interface is configured to couple the first photographing module 100 and the processor 300, and the processor 300 is configured to perform the foregoing method embodiments.

In a possible design, the electronic device further includes a second photographing module 200 configured to obtain a depth information image. A photographing lens of the first photographing module 100 is adjacent to a photographing lens of the second photographing module 200. According to the solution provided in this embodiment, two adjacent photographing modules are used to enable ranges corresponding to the depth information image and a photographed image to coincide to the greatest extent.

In a possible design, the first photographing module 100 includes a focus motor 1001 and a zoom lens 1002, and the processor 300 controls the focus motor to push the zoom lens to change a focal length. The second photographing module 200 is a TOF photographing module configured to photograph the depth information image. The depth information image and images of a plurality focal lengths that are in the process of performing the method and data in the processing process in this embodiment may be stored in a memory 400 of the electronic device.

According to the solution provided in this embodiment, a target focal length range of concern to a user is selected using an initial focal length, such that there is no need to obtain images of all focal lengths of a lens, a quantity of obtained images and processing time of registration and fusion can be reduced, and an extended depth of field image in a depth of field range of concern to the user can be obtained.

An embodiment of this application further provides a computer-readable storage medium. The computer-readable storage medium stores a computer program. When the computer program runs on a computer, the computer is enabled to perform the communication method according to the foregoing embodiments.

In addition, an embodiment of this application further provides a computer program product. The computer program product includes a computer program. When the computer program runs on a computer, the computer is enabled to perform the communication method according to the foregoing embodiments.

All or some of the foregoing embodiments may be implemented using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive, solid state disk (SSD), etc.), or the like.

A person of ordinary skill in the art may be aware that the units and algorithm steps described in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of the foregoing system, apparatus, and unit, reference may be made to a corresponding process in the foregoing method embodiments. Details are not described herein again.

In embodiments of this application, when any of the functions is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application.

Any variation or replacement readily figured out by a person skilled in the art within the technical scope disclosed in this application shall fall within the protection scope of this application. The protection scope of this application shall be subject to the protection scope of the claims.

What is claimed is:

1. A method for obtaining extended depth of field images, wherein the method comprises:
    obtaining a depth information image of a photographed object;
    collecting statistics about areas of pixels representing different depths in the depth information image;
    obtaining depth distribution based on the statistics;
    searching the depth distribution for a local pixel area peak value and a local pixel area valley value on both sides of a first depth corresponding to an initial focal length, wherein the local pixel area peak value and the local pixel area valley value are a peak value and a valley value that are in the depth distribution and that are closest to the first depth corresponding to the initial focal length;

obtaining a plurality of images of the photographed object for a plurality of focal lengths in a target focal length range, wherein the target focal length range is based on a second depth corresponding to the local pixel area peak value and a third depth corresponding to the local pixel area valley value, and wherein the target focal length range comprises the initial focal length; and registering and fusing the plurality of images to obtain an extended depth of field image.

2. The method according to claim 1, wherein the initial focal length is based on the photographed object, wherein the initial focal length is to focus the photographed object, and wherein the initial focal length is a focal length at which a lens currently performs focusing on the photographed object.

3. The method according to claim 2, wherein the initial focal length being based on the photographed object comprises:

obtaining the photographed object through automatic focus; or selecting the photographed object based on an input of a user, wherein the input of the user comprises a viewfinder specified by the user, and wherein the viewfinder is specified by the user by tapping a region of the viewfinder on a touchable display screen.

4. The method according to claim 1, wherein the target focal length range is less than a range of all focal lengths of a focus motor in a shooting range.

5. The method according to claim 1, wherein obtaining the plurality of images of the photographed object comprises sequentially selecting the plurality of focal lengths from one end to another end of the target focal length range based on a preset spacing.

6. The method according to claim 1, wherein obtaining the depth information image of the photographed object comprises obtaining, in response to a trigger condition being met, the depth information image of the photographed object.

7. The method according to claim 1, further comprising obtaining the plurality of focal lengths in the target focal length range by controlling a focus motor to perform focusing in the target focal length range based on a step focal length of the focus motor, wherein the step focal length is based on a photographing depth of field.

8. The method according to claim 1, wherein the plurality of images is obtained by a first photographing device, wherein the depth information image is obtained by a second photographing device, and wherein a first photographing lens of the first photographing device is adjacent to a second photographing lens of the second photographing device.

9. An apparatus for obtaining extended depth of field images, wherein the apparatus comprises:

a processor; and a memory configured to store instructions executable by the processor to cause the apparatus to:

obtain a depth information image of a photographed object;

collect statistics about areas of pixels representing different depths in the depth information image;

obtain depth distribution based on the statistics;

search the depth distribution for a local pixel area peak value and a local pixel area valley value on both sides of a first depth corresponding to an initial focal length, wherein the local pixel area peak value and the local pixel area valley value are a peak value and a valley value that are in the depth distribution and that are closest to the first depth corresponding to the initial focal length;

obtain a plurality of images of the photographed object for a plurality of focal lengths in a target focal length range, wherein the target focal length range is based on a second depth corresponding to the local pixel area peak value and a third depth corresponding to the local pixel area valley value, and wherein the target focal length range comprises the initial focal length; and register and fuse the plurality of images to obtain an extended depth of field image.

10. The apparatus according to claim 1, wherein the initial focal length is based on the photographed object, wherein the initial focal length is to focus the photographed object, and wherein the initial focal length is a focal length at which a lens currently performs focusing on the photographed object.

11. The apparatus according to claim 9, wherein the processor is configured to execute the instructions to further cause the apparatus to:

obtain the photographed object through automatic focus; or select the photographed object based on an input of a user, wherein the input of the user comprises a viewfinder specified by the user, and wherein the viewfinder is specified by the user by tapping a region of the viewfinder on a touchable display screen.

12. The apparatus according to claim 9, wherein the target focal length range is less than a range of all focal lengths of a focus motor in a shooting range.

13. The apparatus according to claim 9, wherein the processor is configured to execute the instructions to further cause the apparatus to obtain the depth information image of the photographed object by obtaining, in response to a trigger condition being met, the depth information image of the photographed object.

14. The apparatus according to claim 9, wherein the processor is configured to execute the instructions to further cause the apparatus to control a focus motor to perform focusing in the target focal length range based on a step focal length of the focus motor in order to obtain the plurality of focal lengths, wherein the step focal length is based on a photographing depth of field.

15. The apparatus according to claim 9, wherein the plurality of images is obtained by a first photographing device, wherein the depth information image is obtained by a second photographing device, and wherein a first photographing lens of the first photographing device is adjacent to a second photographing lens of the second photographing device.

16. A non-transitory computer-readable storage medium configured to store instructions, which when executed by a processor of an apparatus, cause the apparatus to:

obtain a depth information image of a photographed object;

collect statistics about areas of pixels representing different depths in the depth information image;

obtain depth distribution based on the statistics;

search the depth distribution for a local pixel area peak value and a local pixel area valley value on both sides of a first depth corresponding to an initial focal length, wherein the local pixel area peak value and the local pixel area valley value are a peak value and a valley value that are in the depth distribution and that are closest to the first depth corresponding to the initial focal length;

obtain a plurality of images of the photographed object for a plurality of focal lengths in a target focal length range, wherein the target focal length range is based on a second depth corresponding to the local pixel area peak value and a third depth corresponding to the local pixel area valley value, and wherein the target focal length range comprises the initial focal length; and register and fuse the plurality of images to obtain an extended depth of field image.

17. The non-transitory computer-readable storage medium according to claim 16, wherein the initial focal length is based on the photographed object, wherein the initial focal length is to focus the photographed object, and wherein the initial focal length is a focal length at which a lens currently performs focusing on the photographed object.

18. The non-transitory computer-readable storage medium according to claim 16, wherein the processor is configured to execute the instructions to further cause the apparatus to:

obtain the photographed object through automatic focus; or select the photographed object based on an input of a user, wherein the input of the user comprises a viewfinder specified by the user, and wherein the viewfinder is specified by the user by tapping a region of the viewfinder on a touchable display screen.

19. The non-transitory computer-readable storage medium according to claim 16, wherein the target focal length range is less than a range of all focal lengths of a focus motor in a shooting range.

20. The method according to claim 6, wherein the trigger condition is met when a first photographing device enters a corresponding photographing mode, or when a user selects an extended depth of field function.

* * * * *

UNITED STATES PATENT AND TRADEMARK OFFICE
CERTIFICATE OF CORRECTION

PATENT NO.         : 12,205,313 B2
APPLICATION NO.    : 17/698631
DATED              : January 21, 2025
INVENTOR(S)        : Jiping Liao et al.

Page 1 of 1

It is certified that error appears in the above-identified patent and that said Letters Patent is hereby corrected as shown below:

In the Claims

Claim 10, Column 24, Line 14: "claim 1" should read "claim 9"

Signed and Sealed this
First Day of April, 2025

Coke Morgan Stewart
*Acting Director of the United States Patent and Trademark Office*